(No Model.)

H. G. MORRIS.
METHOD OF FORMING SECONDARY BATTERY PLATES.

No. 432,834. Patented July 22, 1890.

Witnesses:
O. B. Groupe.
Jno. E. Parker.

Inventor:
Henry G. Morris,
by his Attorneys,
Howson & Howson

UNITED STATES PATENT OFFICE.

HENRY G. MORRIS, OF PHILADELPHIA, PENNSYLVANIA.

METHOD OF FORMING SECONDARY-BATTERY PLATES.

SPECIFICATION forming part of Letters Patent No. 432,834, dated July 22, 1890.

Application filed July 22, 1889. Serial No. 318,236. (No model.)

*To all whom it may concern:*

Be it known that I, HENRY G. MORRIS, a citizen of the United States, and a resident of Philadelphia, Pennsylvania, have invented an Improved Method of Filling Battery-Plates, of which the following is a specification.

The object of my invention is to firmly pack and retain the active material of a storage-battery in the cells of the supporting-grid. This object I attain in the manner fully set forth hereinafter, reference being had to the accompanying drawings, in which—

Figure 1:
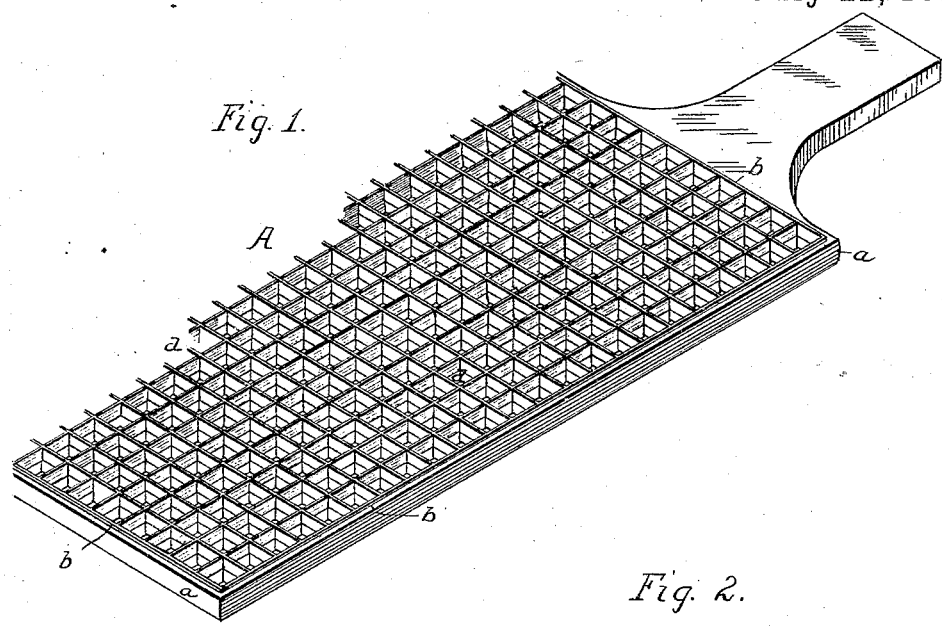
Figure 2:
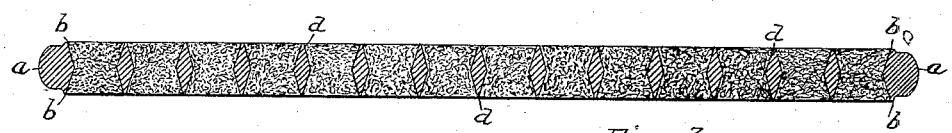
Figure 3:
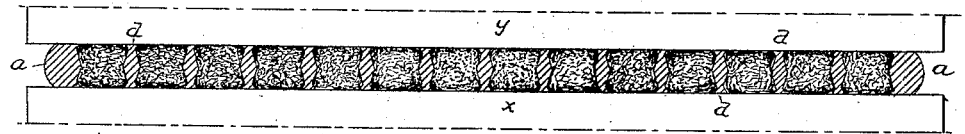
Figure 4:
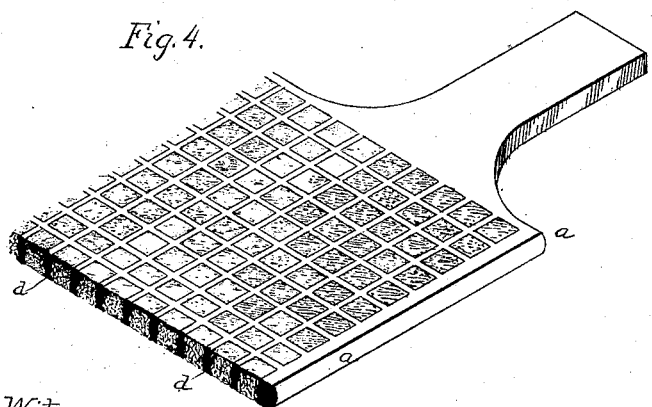

Figure 1 is a perspective view of a portion of the grid before the active material is placed therein. Fig. 2 is an enlarged sectional view of a portion of the grid with the active material placed in the cells of the same. Fig. 3 is a sectional view of the grid with the active material, the whole being compressed between the platens of a press. Fig. 4 is a perspective view showing a section of the finished battery-plate, and Figs. 5 and 6 are views of modified forms of grid.

A is the grid, made up in the present instance of a number of partitions forming quadrangular cells. These ribs, as shown in Fig. 2, are diamond-shaped in cross-section, tapering to a sharp edge, which can be readily crushed down to the proper level, as described hereinafter. Extending around the grid is a rim $a$, having on each edge a narrow sharp rib $b$, the ribs being preferably of the same height as the partition. The grid being placed in position, as shown in Fig. 2, the active material, either in powdered or plastic form, is spread upon the grid and enters the cells formed by the partitions $d$. I prefer, where practicable, to use powdered material. The grid, with the active material contained therein, is then placed upon the bed $x$ of a press—such, for instance, as a hydraulic press—and sufficient pressure applied thereto by means of a platen $y$ to compress not only the active material, but also press down the ribs $b$ and the edges of the partitions $d$ of the grid, thus doing away with outside gaging mechanism for determining the excess of material originally applied to the grid. By this means I am enabled to expose a great extent of active surface, and at the same time separate the surface into a number of independent sections by the narrow partitions, preventing a continuous crust of active material forming on the face of the plate from edge to edge thereof.

Figure 5:
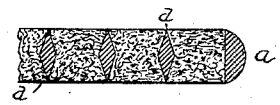
Figure 6:

Instead of having the ribs $b$ $b$ shown in Figs. 1 and 2, the rim $a$ of the grid may be curved or tapered, as shown in Figs. 5 and 6, so as to have at and near each edge a portion of such reduced thickness that it can be readily compressed under the action of the mechanism employed for pressing the active material into the cells of the grid.

I claim as my invention—

The mode herein described of forming plates for storage-batteries, said mode consisting in first forming a grid with partitions tapering to a thin edge and forming throughout the grid-cells without any intervening supports for the active material, then spreading the active material over the entire plate, so as to fill the cells, and finally simultaneously compressing the active material and the thin edges of the partitions, whereby the active material is compressed in the cells without material reduction in the area of the exposed faces of said bodies of active material, substantially as specified.

In testimony whereof I have signed my name to this specification in the presence of two subscribing witnesses.

HENRY G. MORRIS.

Witnesses:
WILLIAM D. CONNER,
HARRY SMITH.